(12) United States Patent
Adams

(10) Patent No.: US 7,099,929 B1
(45) Date of Patent: Aug. 29, 2006

(54) SYSTEM AND METHOD FOR TRANSFERRING INFORMATION IN A HYPERTEXT TRANSFER PROTOCOL BASED SYSTEM

(75) Inventor: Rodney G. Adams, Rowlett, TX (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/357,250

(22) Filed: Jul. 20, 1999

(51) Int. Cl.
*G06F 15/16* (2006.01)

(52) U.S. Cl. ............... 709/219; 709/203; 709/217; 709/227

(58) Field of Classification Search ............... 709/200, 709/201, 203, 217, 218, 219, 224, 227, 229
See application file for complete search history.

(56) References Cited

U.S. PATENT DOCUMENTS

| | | | | |
|---|---|---|---|---|
| 5,774,670 A * | 6/1998 | Montulli | | |
| 5,826,242 A * | 10/1998 | Montulli | | |
| 5,847,957 A | 12/1998 | Cohen et al. | ......... | 364/468.15 |
| 5,867,667 A | 2/1999 | Butman et al. | ........ | 395/200.79 |
| 5,870,544 A | 2/1999 | Curtis | ................... | 395/187.01 |
| 5,870,769 A | 2/1999 | Freund | ....................... | 707/501 |
| 6,055,573 A * | 4/2000 | Gardenswartz et al. | | |
| 6,085,190 A * | 7/2000 | Sakata | | |
| 6,134,592 A * | 10/2000 | Montulli | | |
| 6,209,038 B1 * | 3/2001 | Bowen et al. | | |
| 6,225,995 B1 * | 5/2001 | Jacobs et al. | | |
| 6,226,752 B1 * | 5/2001 | Gupta et al. | | |
| 6,279,112 B1 * | 8/2001 | O'Toole et al. | ............. | 713/201 |
| 6,298,330 B1 * | 10/2001 | Gardenswartz et al. | | |
| 6,298,348 B1 * | 10/2001 | Eldering | | |
| 6,321,262 B1 * | 11/2001 | Springer | | |
| 6,330,566 B1 * | 12/2001 | Durham | ................... | 707/104.1 |
| 6,336,100 B1 * | 1/2002 | Yamada | | |
| 6,353,839 B1 * | 3/2002 | King et al. | ................. | 715/513 |
| 6,401,094 B1 * | 6/2002 | Stemp et al. | ................. | 707/10 |
| 6,446,076 B1 * | 9/2002 | Burkey et al. | ............. | 707/102 |
| 6,470,378 B1 * | 10/2002 | Tracton et al. | ............. | 709/203 |
| 6,594,699 B1 * | 7/2003 | Sahai et al. | ................. | 709/228 |
| 6,832,241 B1 * | 12/2004 | Tracton et al. | ............. | 709/203 |

* cited by examiner

*Primary Examiner*—Moustafa M. Meky
(74) *Attorney, Agent, or Firm*—Withrow & Terranova, P.L.L.C.

(57) ABSTRACT

A system and method for transferring information between an HTTP client and an HTTP server where a state object is stored on the HTTP client before making a request to the HTTP server. The state object may be sent to any HTTP server in any domain. In one embodiment, a particular state object is sent to the HTTP server based on the information requested from the HTTP client. In another embodiment a state object is automatically created by the HTTP client based on previously requested information. Additionally, the state object and their attributes can be defined and/or created by the user.

21 Claims, 2 Drawing Sheets

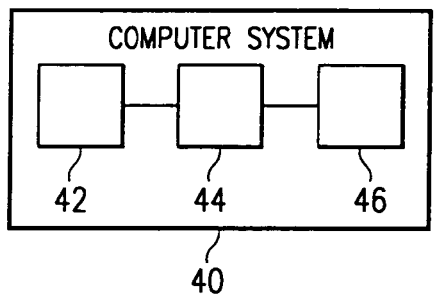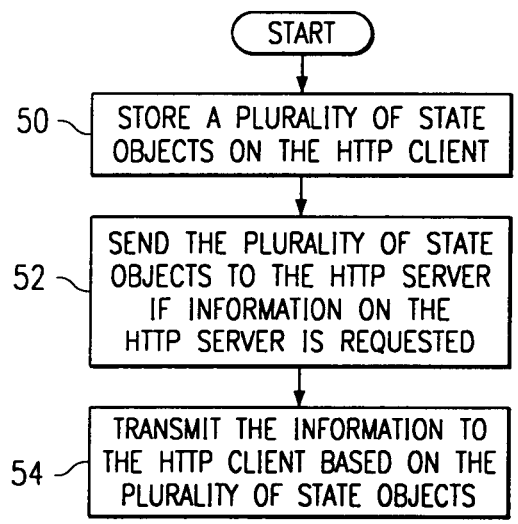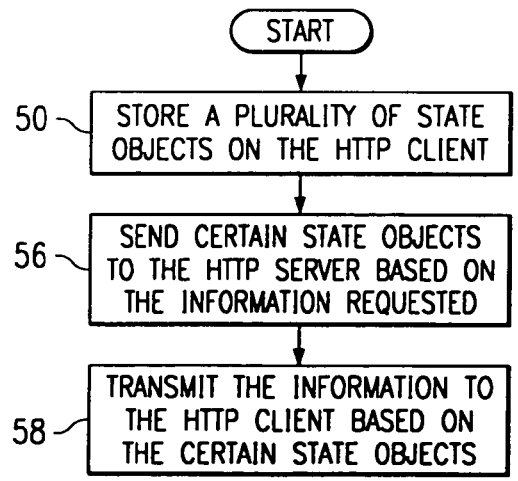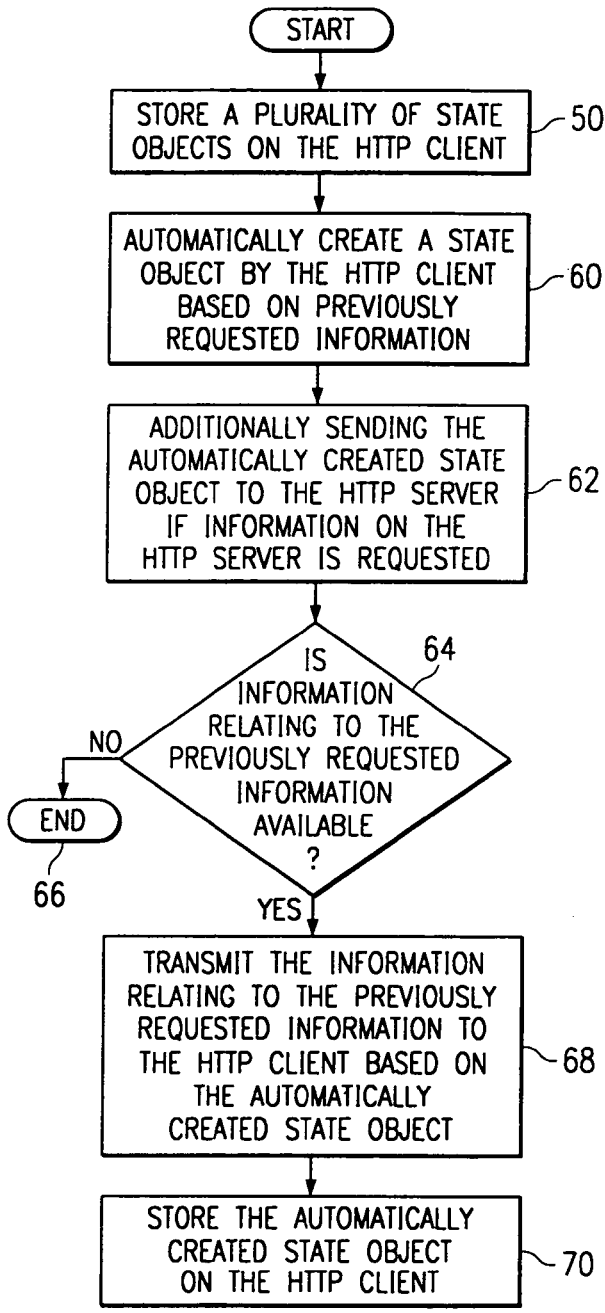

SYSTEM AND METHOD FOR TRANSFERRING INFORMATION IN A HYPERTEXT TRANSFER PROTOCOL BASED SYSTEM

BACKGROUND

This disclosure relates generally to information transfer and, more particularly, to a system and method for transferring information between a HyperText Transfer Protocol (HTTP) client and an HTTP server.

A prior art system and method for transferring information between a server and a client is described in U.S. Pat. No. 5,774,670 issued Jun. 30, 1998 to Montulli. In this prior art system and method, an HTTP client requests a file from an HTTP server. The HTTP client and HTTP server are both computers that use the HTTP to communicate with each other. After the HTTP server receives the request, it transmits the file, as well as a state object, to the HTTP client. The state object, also known as a "cookie", typically includes a name attribute, an expiration attribute, a domain attribute, a path attribute, and an attribute requesting transmission using a secure channel.

The name attribute serves to identify a cookie and is a name for the cookie while the expiration attribute defines the valid lifetime of the cookie while the expiration attribute defines the valid lifetime of the corresponding cookie. The domain attribute defines a domain in which the cookie is valid and is set using the domain name (store.com, for example) of the server sending the file to the client. The client would examine the domain attribute when making future server requests. If the server that the client system is accessing falls within the defined domain name, then the cookie may be sent to the server when making the request. Thus, after making an initial request to the server and providing information to the server (such as a user name, password, credit card information, etc.), future requests to the server within the domain name can be made without having to continually provide the information. This information is sent in the cookie.

The path attribute is used to specify a subset of file system directories in a domain for which the cookie is valid. If a cookie is valid within a particular domain, then the path name (\music, for example) for a requested document is compared with the path attribute. If there is a match, the cookie is considered valid and is sent with the request.

In some systems, the attribute requesting transmission using a secure channel will only transmit the cookie to an HTTP server over a secure sockets layer (SSL), referred to as an HTTPS server.

There are, however, many limitations associated with using such a prior art system and method. To begin with, a state object is transmitted from a server to a client only after the client has requested information (such as a file, document, video, etc.) from the server. Thus, a client must have interaction with a server before the state object can be sent from the server and stored on the client to be used in future requests to the server. Another limitation is the fact that the state object can only be used when a future request is made from the client to a server that is within the domain identified in the domain attribute. If the client requests information from a server that is not within the identified domain name, then the state object may not be used. Instead, another state object must be created by the server in the new domain being accessed. For example, a user may provide information to a domain name (such as store1.com) to purchase a compact disk (CD). If the user then wanted to access a different domain name (such as store2.com) to purchase another compact disk, the store1.com state object could not be utilized. Instead, the user would have to provide much of the same information to store2.com that was provided to store1.com so that a new state object could be created to allow the user to perform a similar function (e.g., buy a CD) from store2.com. Thus, transactions may only be handled between specific clients and specific servers. This leads to inefficiencies for the user and within the network because time will be spent creating multiple state objects that perform similar functionality and space will be utilized storing these multiple state objects.

SUMMARY

A technical advance is provided by a system and method for transferring information in an HTTP based system. In one embodiment, the method presents custom information to an HTTP client from an HTTP server. Initially, one or more state objects are stored at the HTTP client. The state objects may include one or more attributes, which can be defined by a user. Thereafter, when an interaction between the HTTP client and the HTTP server is initiated and information is requested from the HTTP server, the HTTP client can send one or more of the state objects to the HTTP server. In so doing, the information from the HTTP server can be customized or formatted responsive to the state object(s) before it is sent to the HTTP client.

In one embodiment, the state objects sent to the HTTP server are based on the specific information requested. Furthermore, the state object may be automatically created by the HTTP client based on information previously requested from a different HTTP server.

In one embodiment, the method works with many different HTTP servers. As a result, information stored in the HTTP client computer can be created once, and then provided to the different HTTP servers as necessary.

Therefore, different embodiments of the present invention provide many different advantages. For example, one advantage of the present invention is to provide a system and method for transferring state information (or objects) between an HTTP client and an HTTP server where state objects are stored on the HTTP client prior to any interaction with the HTTP server.

Another advantage of the present invention is to provide a system and method for sending the state objects to any HTTP server in any domain.

Yet another advantage of the present invention is to provide a system and method for sending a particular state object to the HTTP server based on the information requested from the HTTP client.

Still another advantage of the present invention is to provide a system and method for automatically creating a state object by the HTTP client based on previously requested information.

Another advantage of the present invention is to provide a system and method for providing a plurality of state object attributes that can be defined and/or created by the user.

BRIEF DESCRIPTION OF THE DRAWINGS

FIG. 3 depicts a computer system of the present invention.

FIG. 4 depicts a flow chart for transferring state information between an HTTP client and an HTTP server of the present invention.

FIG. 5 depicts a flow chart for sending certain state objects to the HTTP server of the present invention based on the information requested.

FIG. 6 depicts a flow chart for automatically creating a state object by the HTTP client of the present invention based on previously requested information.

DESCRIPTION OF THE PREFERRED EMBODIMENTS

Figure 1:
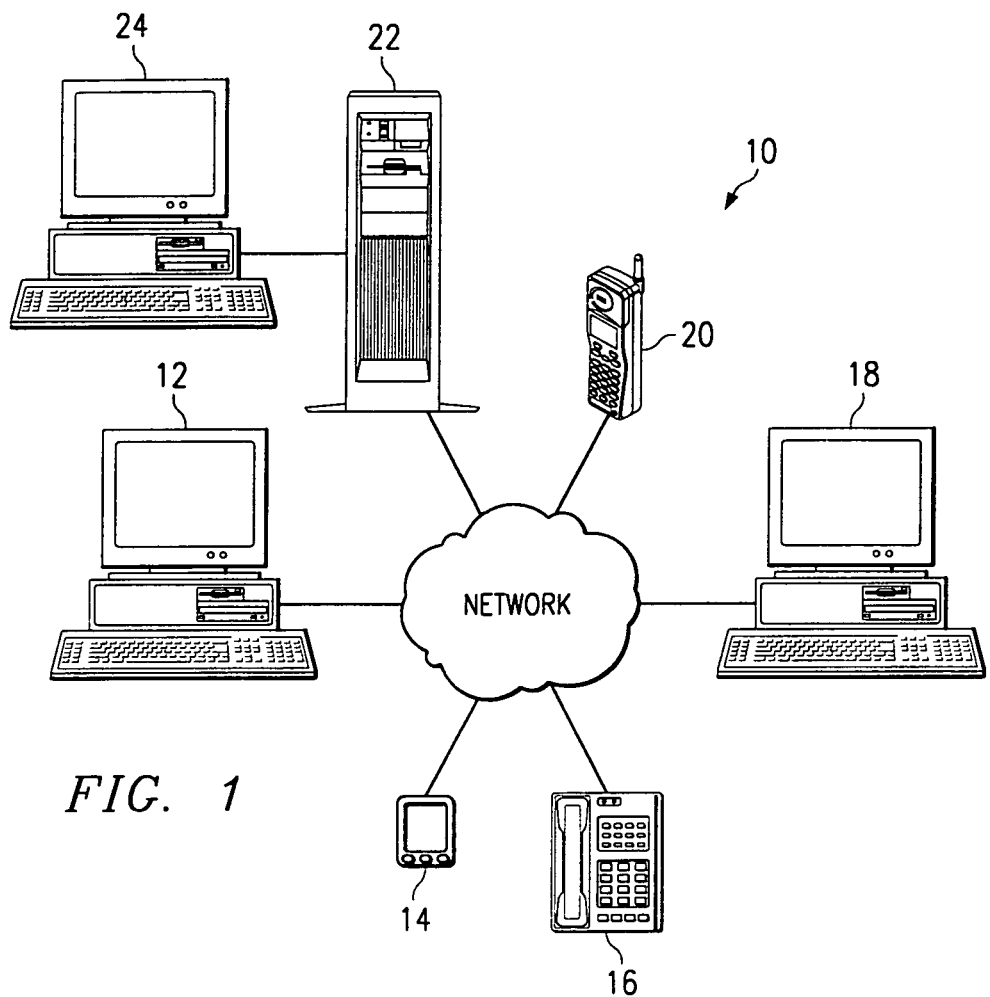
FIG. 1 depicts a communications network of the present invention.

FIG. 1 depicts a communications network, shown in general by the reference numeral 10, which permits the transfer of information between various devices via a network that includes switches, routers, and other equipment (not shown). Such devices include computers 12, 18 and 24, television 14, digital phone 16, mobile phone 20, and server 22.

When utilizing the internet, a user (e.g., the client computer 18) typically makes a request to a server (e.g., the computer 12) for information. The request is usually made by specifying a Uniform Resource Locator ("URL") which is an address for a web page that contains the information to be accessed. After the information has been accessed, a cookie that contains the attributes listed above is sent from the server 12 and stored on the client 18. The cookie can then be used only if the user is accessing the same server.

The present invention overcomes this limitation by allowing the user to create a profile by defining various state objects (which include at least one attribute) prior to any interaction with the server 12. The user may create the profile before, during, or after the installation of a web browser and store the profile on his (the client) computer's 18 memory. The profile may contain the various attributes discussed above (e.g., name, domain, path, expiration, and secure channel, which is an optional attribute) as well as a region attribute, a display attribute, a preferences attribute, and a personal attribute.

The region attribute describes the city, state, and/or the country that the user lives in. For example, the user may indicate that he lives in Dallas, Tex. In addition, the region attribute may also contain locations that the user is interested in but does not necessarily live. The display attribute describes the manner in which the user wishes to receive the information. For example, a user with poor eyesight may wish to receive information with large fonts for easier viewing. Also, a user that has difficulty moving his/her hands (from arthritis, for example) may wish to receive information on a web page that has large "buttons" for performing various actions (such as going backward to a previous web page, printing the web page, etc.). The software for providing these features may be provided by the client or the server. The preferences attribute describes the user's preferences with the types of information that are received. For example, the user may indicate that he not receive material which may be considered obscene or pornographic. The personal attribute describes personal information about the user such as credit card information, home address, telephone number, email address, blood type, health concerns, emergency numbers, etc.

In addition to the attributes being defined, various other (or new) attributes may be created and various other features within these attributes can be defined. Also, the names and definitions of the attributes may be standardized so that any web site (or any server in any domain) receiving the attributes will be able to recognize them. Additionally, a free-form input may be allowed wherein the user could choose generic cookies and generic attributes (from a common web site, for example) that would provide certain information. Also, attributes may posses different names but provide similar functionality. For example, the information input into the region attribute could also be placed in a location attribute. The attributes could also be specified if they informally adhere to various parameters that could be understood by receiving web sites.

After the user has set up his/her profile, the attributes in the profile may be provided to a server the first time a client makes an information request. The server can then use the attributes to generate certain web pages (or other information) and present them to the user in a particular manner. For example, the user may access a web page for the first time to receive business information. When the server receives this request for business information, the cookie containing the region attribute (as well as the name attribute, domain attribute, path attribute, personal attribute, etc.) will be sent. Thus, when the server provides the user with the web page including the business information, the current temperature in Dallas (or the five day forecast for Dallas) can also be provided. As such, information is provided from the server in a customized manner the very first time that information is requested.

This profile can also be used to make requests to any server in any domain without having to re-input similar information. For example, the client may have accessed a financial site (such as broker1.com). Since the client's region attribute was sent with the cookie, the regional information (and other locations of interest) would immediately be available to broker1.com. Thus, the user would receive financial information specific to the Dallas area as well as any other noted location of interest.

The user may then want to access a different financial site (such as broker2.com). Even though the broker2.com site resides on a different server and is in a different domain than the broker1.com web site, the user would still receive regional information without having to request it over and over again from the various financial sites.

By utilizing the user's region attribute, display attribute, preferences attribute, and personal attribute, the user will experience greater control over the information he receives because he will be able to receive customized information the first time he accesses a site. Additionally, the user will become more efficient because less time will be spent providing similar information to various web sites.

Figure 2:
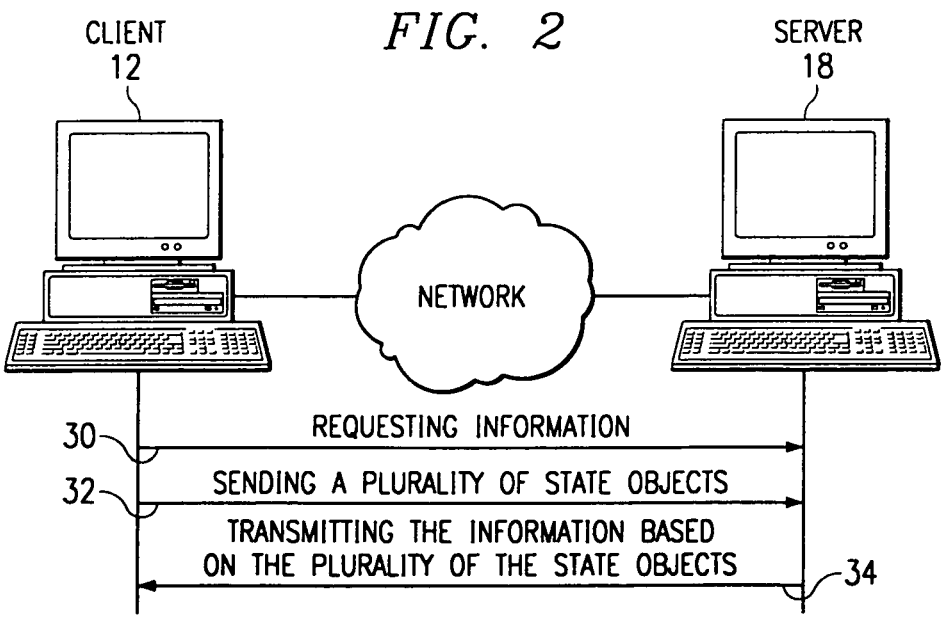
FIG. 2 depicts a message flow between an HTTP client and HTTP server of the present invention.

FIG. 2 shows the messaging flow between the client 12 and the server 18. Prior to the client sending an information request 30 to the server 18, the user will have already created and stored (on the client 12) his profile. When the information request 30 is sent to the server 18, the cookies (or state objects) that contain the attributes described above are also sent to the server 18. One cookie that contains all of the attributes may be sent to the server 18 or a number of cookies containing a few of the attributes may be sent. Although the information request message 30 and the plurality of state objects being sent message 32 are shown as two separate messages, they may be combined into one message. Once the server 18 receives the cookie(s), the requested information is transferred to the client 12 based on the various attributes (name, domain, path, region, display, preferences, personal, etc.) set up by the user.

In another embodiment, only certain cookies containing certain attributes are sent to the server, based on the information requested. Based on the cookies and attributes received, the server then transmits the appropriate information to the client. For example, if the user only wanted to receive business information and not purchase any goods, his personal attribute may not be sent. The client could either specify which attributes could be sent or certain attributes would not be sent based on the type of site being accessed. For example, if a user were accessing news.com to review business information, the client, based on the domain name being accessed, would not send the personal attribute because the chances are slim that any goods would be purchased or that any of the other information contained in the personal attribute would be needed. If, however, the user was accessing store1.com, there is a good chance that goods would be purchased and so the personal attribute would be sent.

In another embodiment, a cookie may automatically be created by the client based on previously requested information. As the user is viewing different web sites and requesting various information (through search criteria, hyperlink access, etc.) the client can keep track of and store these choices and preferences. If certain information is frequently requested (or previously requested a number of times), the client will automatically create a state object (cookie) that contains an attribute specifically used to retrieve the frequently requested information. Additionally, the frequently requested information can automatically be placed in an existing attribute (such as the preferences attribute).

When information on the server is requested, the automatically created cookie and/or attribute will be sent to the server. Based on this automatically created cookie and/or attribute, the information relating to the previously (or frequently) requested information is sent to the client. The automatically created cookie and/or attribute is then stored on the client.

For example, a user may, over the course of a few weeks or months, request information or perform searches relating to John F. Kennedy (JFK). The client, through a software program, for example, may track these requests and searches. If enough (a predetermined number) JFK requests and searches were made, the client would automatically place that knowledge in an attribute (either new or existing). This attribute would be sent in a cookie when any type of server request was made (or when allowed by the user). Thus, if the user utilized an on-line auction house, JFK related items could be made available to the user the moment the site was accessed.

FIG. 3 describes a computer system 40 which comprises memory 42 and a computer readable medium 46, both of which are coupled to a processor 44. The processor 44 may be a microprocessor, a digital signal controller (DSP), a microcontroller, or other processing system. The computer readable medium contains executable program instructions for storing state objects on a client, sending the state objects to the server if information on a server is requested, and transmitting the information to the client based on the state objects.

In another embodiment, a communications network includes a client system (that has a client processor) and a client computer readable medium that is coupled to the client processor. The client computer readable medium contains program instructions for storing state objects, requesting information from a server, sending the state objects to the server, and receiving the information from the server based on the state objects. The communications network also includes a server system (that has a server processor) and a server computer readable medium that is coupled to the server processor. The server system is coupled to the client system. The server computer readable medium contains program instructions for receiving a request for information from the client system, receiving the state objects, and transmitting the information to the client system based on the state objects.

FIG. 4 describes a method for transferring state information between an HTTP client and an HTTP server. The method begins at step 50 where a plurality of state objects is stored on the HTTP client. At step 52, the plurality of state objects is sent to the HTTP server if information on the HTTP server is requested. At step 54, the information is transmitted to the HTTP client based on the plurality of state objects.

FIG. 5 describes a method for sending certain state objects to the HTTP server based on the information requested. The method begins at step 50 where a plurality of state objects is stored on the HTTP client. At step 56, certain state objects are sent to the HTTP server based on the information requested. At step 58, the information is transmitted to the HTTP client based on the certain state objects.

FIG. 6 describes a method for automatically creating a state object by the HTTP client based on previously requested information. The method begins at step 50 where a plurality of state objects is stored on the HTTP client. At step 60, a state object is automatically created by the HTTP client based on previously requested information. At step 62, the automatically created state object is sent (in addition to any other state objects and/or attributes) to the HTTP server if information on the HTTP server is requested. At step 64, a check is made to determine if information relating to the previously requested information is available on the HTTP server. If it is not, the method proceeds to step 66 where no action is taken. If it is, however, the method proceeds to step 68 where the information relating to the previously requested information is transmitted to the HTTP client based on the automatically created state object. At step 70, the automatically created state object is stored on the HTTP client.

Different embodiments of the present invention enjoy several different advantages. For example, a user will experience greater control over the information he receives because he will be able to receive customized information the very first time he accesses a web site. Additionally, the user will become more efficient because less time will be spent providing similar information to various web sites.

Another advantage is the ability of the client to only send certain state objects to the server. As such, less information is processed by the server resulting in speedier transactions. A further advantage is the ability of the client to automatically create a state object based on a history of the user's previously requested information.

It is understood that several variations may be made in the foregoing without departing from the scope of the present invention. For example, the region attribute, display attribute, preference attribute, and personal attribute may be instances of the name attribute. Further, the state objects may be stored on a different device than the client and may be accessed by the client in any known manner. Also, other devices known as "network appliances" (such as washing machines, coffee makers, etc.) that will be able to connect to the network, may be utilized in a similar manner as described above. Additionally, based on the device making an HTTP request, only certain information may be sent from the server. For example, a mobile phone, while making an HTTP request, may identify itself as a restricted-display type device to the server. In response, the server may only send text information (and not graphics) to the mobile phone.

It is understood that other modifications, changes and substitutions are intended in the foregoing disclosure and in some instances some features of the disclosure will be employed without corresponding use of other features. Accordingly, it is appropriate that the appended claims be construed broadly and in a manner consistent with the scope of the disclosure.

What is claimed is:

1. A method of presenting custom information to an HTTP client
   from an HTTP server, the method comprising the steps of:
   creating a plurality of state objects at the HTTP client;
   storing the plurality of state objects on the HTTP client prior to an initial interaction with the HTTP server;
   initiating an interaction between the HTTP client and the HTTP server;
   requesting information from the HTTP server;
   sending at least one of the state objects to the HTTP server so that the information can be formatted responsive to the sent state object;
   receiving the formatted information from the HTTP client;
   based on previously requested information, automatically creating a state object by the HTTP client;
   storing the automatically created state object on the HTTP client;
   if information on the HTTP server is requested, additionally sending the automatically created state object to the HTTP server; and
   based on the automatically created state object, transmitting the information relating to the previously requested information to the HTTP client.

2. The method of claim 1 further comprising the step of:
   selecting the at least one of the state objects based on the information requested and prior to any interaction between the HTTP client and the HTTP server.

3. The method of claim 1, wherein the plurality of state objects include at least one attribute.

4. The method of claim 3 further comprising the step of defining the attributes by a user.

5. The method of claim 3 further comprising the steps of:
   creating new attributes by a user; and
   defining the new attributes by the user.

6. A method of transferring state objects between an HTTP client and a plurality of HTTP servers, the method comprising the steps of:
   creating a plurality of state objects at the HTTP client;
   storing the plurality of state objects on the HTTP client prior to any interaction with a first HTTP server;
   if information on the first HTTP server is requested sending the plurality of state objects to the first HTTP server;
   if information on a second HTTP server is requested, sending the plurality of state objects to the second HTTP server;
   based on the plurality of state objects, transmitting the information to the HTTP client;
   based on previously requested information, automatically creating a state object by the HTTP client;
   storing the automatically created state object on the HTTP client;
   if information on the plurality of HTTP servers is requested, additionally sending the automatically created state object to the plurality of HTTP servers; and
   based on the automatically created state object, transmitting the information relating to the previously requested information to the HTTP client.

7. The method of claim 6, wherein the plurality of HTTP servers may be located in a single domain.

8. The method of claim 6, wherein the plurality of HTTP servers may be located in a plurality of domains.

9. The method of claim 6 further comprising the steps of:
   based on the information requested, sending certain state objects to the plurality of HTTP servers; and
   based on the certain state objects, transmitting the information to the HTTP client.

10. The method of claim 6, wherein the plurality of state objects include at least one attribute.

11. The method of claim 10 further comprising the step of defining the attributes by a user.

12. The method of claim 10 further comprising the steps of:
    creating new attributes by a user; and
    defining the new attributes by the user.

13. A communication network comprises:
    a client system having a client processor and a client computer readable medium coupled to the client processor, the client computer readable medium containing program instructions for:
      creating a plurality of state objects including at least one automatically created state object based on previously requested information;
      storing the plurality of state objects and the at least one automatically created state object independent of an HTTP server;
      requesting information from the HTTP server;
      sending the plurality of state objects to the HTTP server including the at least one automatically created state object when the requested information includes previously requested information; and
      receiving the information from the HTTP server based on the plurality of state objects or the at least one automatically created state object; and
    a server system having a server processor and a server computer readable medium coupled to the server processor, the server system coupled to the client system, the server computer readable medium containing program instructions for:
      receiving the request for information from the client system, the request being a first interaction between the HTTP server and the HTTP client;
      receiving the plurality of state objects and the at least one automatically created state object; and
      transmitting the information to the client system based on the plurality of state objects, wherein the information relating to the previously requested information is transmitted to the client system based on the at least one automatically created state object.

14. A computer readable medium on an HTTP client, wherein the computer readable medium contains executable program instructions for:
    creating a plurality of state objects at the HTTP client including at least one automatically created state object based on previously requested information;
    storing the plurality of state objects and the at least one automatically created state object on the HTTP client independent of an HTTP server;
    requesting information from the HTTP server;
    sending the plurality of state objects to the HTTP server including the at least one automatically created state object when the requested information includes previously requested information; and receiving the information from the HTTP server based on the plurality of state objects and the at least one automatically created state object.

15. A computer readable medium on an HTTP server, wherein the computer readable medium contains executable program instructions for:

receiving a request for information from an HTTP client, the request being a first interaction between any HTTP server and the HTTP client wherein the request for information includes previously requested information;

receiving, from the HTTP client, a plurality of state objects that were not forwarded by any HTTP server to the HTTP client, the plurality of state objects including at least one automatically created state object that was created based on the previously requested information and stored on the HTTP client; and transmitting the information to the HTTP client based on the plurality of state objects including the at least one automatically created state object.

16. A computer system comprises:

a processor;

memory coupled to the processor; and a computer readable medium coupled to the processor, wherein the computer readable medium includes executable program instructions for:

creating a plurality of state objects at a client;

storing the plurality of state objects on the client, independent of a particular server;

if information on a server is requested, sending the plurality of state objects to the server;

based on the plurality of state objects transmitting the information to the client;

based on previously requested information, automatically creating a state object by the client;

if information on the server is requested, additionally sending the automatically created state object to the server;

based on the automatically created state object, transmitting the information relating to the previously requested information to the client; and storing the automatically created state object on the client.

17. The computer system of claim 16 wherein the plurality of state objects may be sent to any server in any domain.

18. The computer readable medium of claim 16, wherein the executable program instructions further:

based on the information requested, send certain state objects to the server; and based on the certain state objects, transmit the information to the client.

19. The computer readable medium of claim 16, wherein the plurality of state objects include at least one attribute.

20. The computer readable medium of claim 19, wherein the executable program instructions further allow a user to define the attributes.

21. The computer readable medium of claim 19, wherein the executable program instructions further:

allow a user to create new attributes; and allow the user to define the new attributes.

* * * * *